United States Patent [19]

Uno et al.

[11] 4,286,146
[45] Aug. 25, 1981

[54] CODED LABEL AND CODE READER FOR THE CODED LABEL

[75] Inventors: Takeshi Uno; Hirotada Ueda, both of Sayama; Sadahiro Ikeda, Tokyo; Masakazu Ejiri, Tokorozawa; Shinji Matsuoka, Hitachi, all of Japan

[73] Assignee: Hitachi, Ltd., Tokyo, Japan

[21] Appl. No.: 3,011

[22] Filed: Jan. 12, 1979

Related U.S. Application Data

[63] Continuation of Ser. No. 762,148, Jan. 24, 1977, abandoned.

[30] Foreign Application Priority Data

Feb. 6, 1976 [JP] Japan .................................. 51/11478

[51] Int. Cl.³ ...................... G06K 7/10; G06K 19/06; G06K 9/00
[52] U.S. Cl. .................................... 235/456; 235/494; 340/146.3 F; 340/146.3 AC
[58] Field of Search ................. 235/61.11 E, 61.12 N, 235/61.12 R, 456, 494; 340/146.3 F, 146.3 AC, 146.3 A, 146.3 Z; 250/568, 569

[56] References Cited

U.S. PATENT DOCUMENTS

| | | | |
|---|---|---|---|
| 3,258,751 | 6/1966 | Shafer | 340/146.3 AC |
| 3,346,845 | 10/1967 | Fomenko | 340/146.3 AC |
| 3,485,168 | 12/1969 | Martinson | 235/61.12 N |
| 3,694,806 | 9/1972 | Freedman | 340/146.3 F |
| 3,731,065 | 5/1973 | Zucker | 235/61.12 N |
| 3,776,454 | 12/1973 | Jones | 340/146.3 A |
| 3,810,095 | 5/1974 | Bibl | 340/146.3 A |
| 3,827,025 | 7/1974 | Mauch | 340/146.3 F |
| 3,835,297 | 9/1974 | Inoue | 235/61.12 N |
| 3,898,434 | 8/1975 | Bigelow | 235/61.12 N |

*Primary Examiner*—Robert M. Kilgore
*Attorney, Agent, or Firm*—Craig and Antonelli

[57] ABSTRACT

A coded label comprising a code pattern in which first and second segments respectively being substantially square and having reflection factors different from each other are arranged in at least four rows and two columns, and in which at least two of either of the first and second segments are arranged in each column and at least one is arranged in each of the uppermost and lowermost rows.

32 Claims, 18 Drawing Figures

0  1  2  3  4  5  6  7  8  9 a  b  c  d  e  f  g  p  q  L (  )  ´  `

FIG. 6
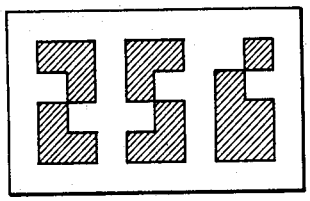
FIG. 7
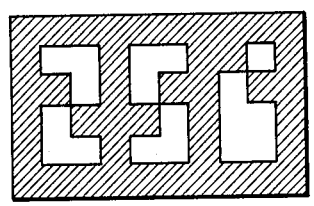
FIG. 9
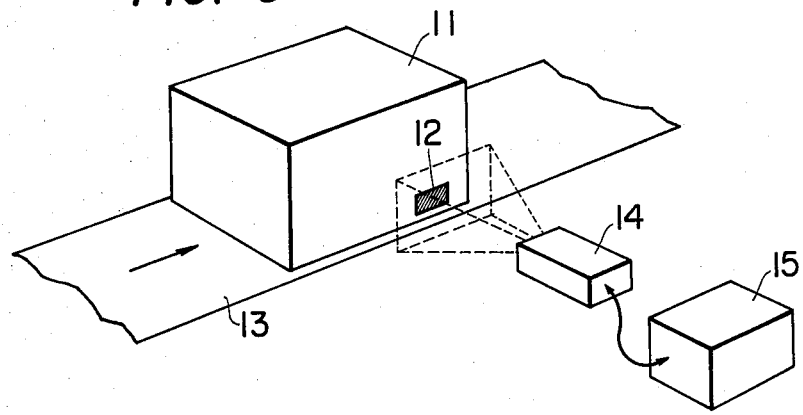
FIG. 8
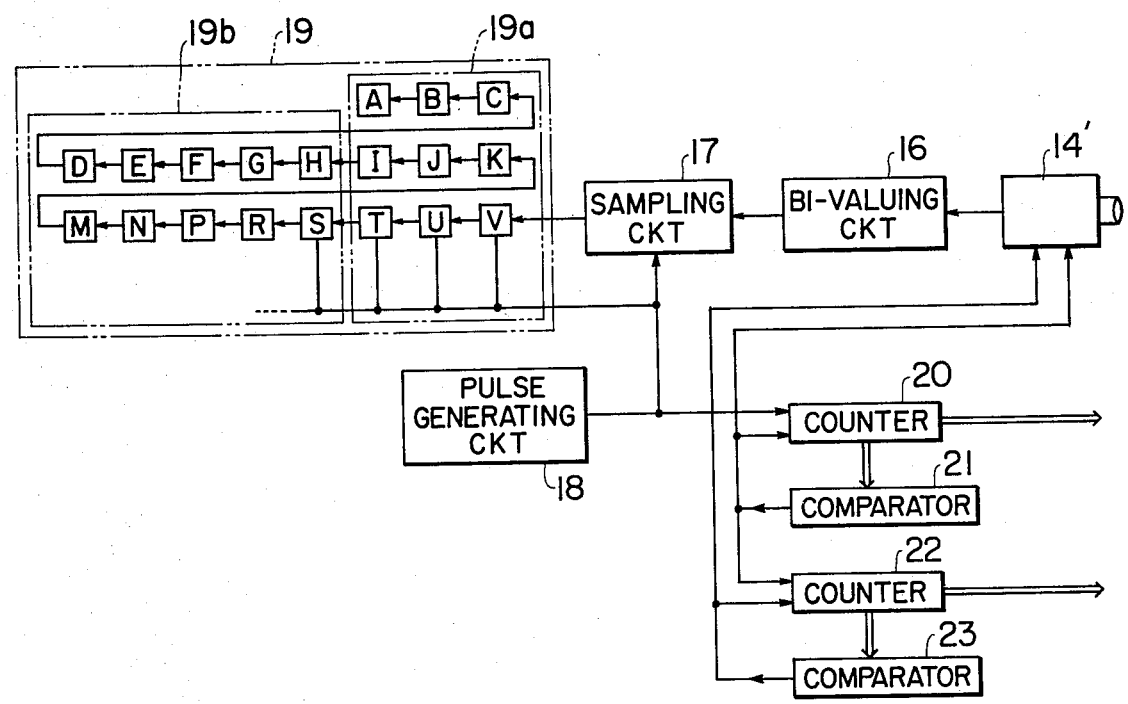
FIG. 10a

FIG. 14        FIG. 15
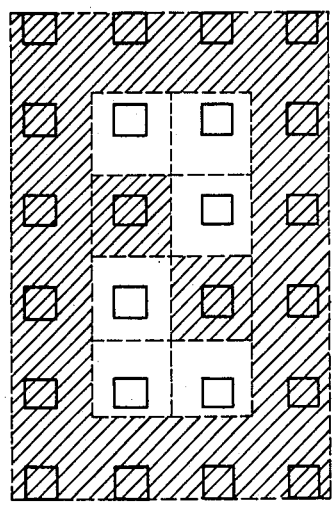
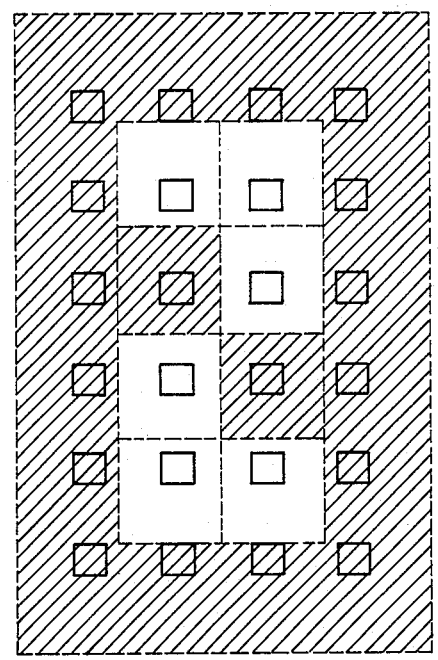
FIG. 16
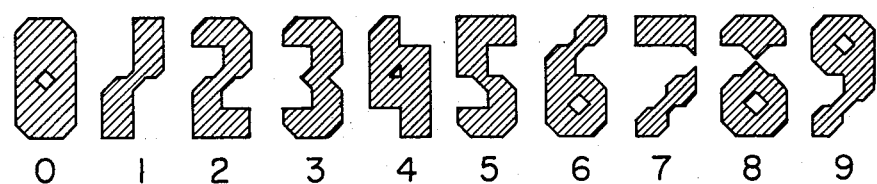
0   1   2   3   4   5   6   7   8   9
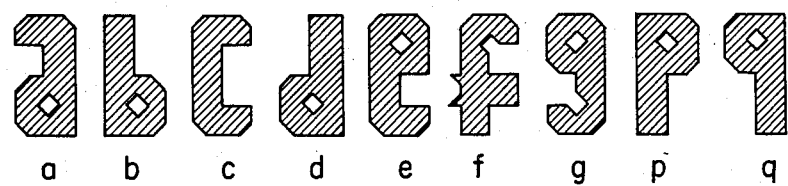
a   b   c   d   e   f   g   p   q
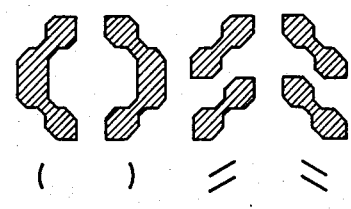
(    )    ∕∕    ∕∕

CODED LABEL AND CODE READER FOR THE CODED LABEL

This is a continuation of application Ser. No. 762,148, filed Jan. 24, 1977, now abandoned.

BACKGROUND OF THE INVENTION

This invention relates to a coded label which is stuck to or printed on an object for the purpose of, for example, facilitating selection, and to a code reader for the label.

As a prior-art coded label of this type, there has been known one in which segments are unidimensionally arrayed in the form of a band. With such label, however, the area occupied by the label becomes very large, and it is impossible to read the code by the visual inspection. A further disadvantage is that, in reading the label by a code reader, the decoding and processing is not easy.

There has also been thought out a coded label in which a plurality of code patterns each having segments arrayed in two rows and two columns are arrayed. However, it has not yet led to the drastic solution to the disadvantages stated above. Furthermore, it has the disadvantage that an erroneous decoding for a code is prone to occur due to a stain or flaw.

SUMMARY OF THE INVENTION

An object of this invention is to provide a coded label which is easily decoded by a code reader.

Another object of this invention is to provide a coded label which allows a large quantity of information to be incorporated in a small area and which can be easily decoded even by the visual inspection.

Still another object of this invention is to provide a coded label which can exclude an erroneous decoding for a pattern having a stain or flaw.

Yet another object of this invention is to provide a code reader which can precisely and easily read the pattern of the aforecited label.

In order to accomplish such objects, this invention provides a coded label comprising a code pattern in which segments having a specific shape and assuming either of two states different from each other are arranged in a plurality of rows and a plurality of columns, each of the uppermost and lowermost rows including at least one such segment of the state different from that of the surroundings.

BRIEF DESCRIPTION OF THE DRAWINGS

FIGS. 5 to 7 are diagrams showing examples in which a plurality of such code patterns according to this invention are arrayed, FIG. 8 is a schematic perspective view showing an embodiment of the fundamental construction of the reader for reading coded labels according to this invention, FIG. 9 is a diagram showing the arrayal of picture elements of an image picked up by the apparatus in FIG. 8, FIGS. 10(a) to 10(c) are block diagrams showing embodiments of the concrete circuit arrangements of parts in the reader in FIG. 8, FIG. 16 is a diagram showing modified examples of the code pattern according to this invention.

DETAILED DESCRIPTION OF THE PREFERRED EMBODIMENTS

Before describing embodiments, the outline of this invention will be explained.

According to the coded label of this invention, unit codes are a plurality of patterns each of which is obtained by providing a group of rectangular or square segments arrayed in, for example, four rows and two columns, and putting one or more of the segments into a state "1" and the other segments and the surroundings into a state "0." Here, the states "0" and "1" correspond to states concerning various properties of light, for example, brightnesses such as white and black or hues such as red and blue. These states may well correspond to magnetic states.

Since such pattern is composed of only several, for example, eight segments assuming the two states, it is easily discriminated by the visual inspection. Moreover, since it is composed of the segments orderly arrayed in, for example, four rows and two columns, the decoding and processing is easy also in case of reading by an apparatus.

The pattern is constructed on the basis of the rectangles or squares having areas being two-dimensional, not on the basis of mere widths being unidimensional. For this reason, there is a high possibility of removing the influences of stains.

Owing to the two-dimensional arrayal of the rectangles or squares, the area of the code pattern per quantity of written information may be smaller than in the prior-art code in which the bands are unidimensionally arrayed.

The patterns each of which is made up of, for example, eight segments assuming the two states exist by 256 kinds. When about 10 to 20 of the 256 kinds of patterns are employed as significant codes, the redundancy becomes very high and errors become easy to check.

Since the coded label of this invention has the features as mentioned above, it can be utilized in such a way that it is stuck onto, for example, a box or package or directly printed thereon, and that it is automatically read for selection by an apparatus or read and judged by the visual inspection. An erroneous decoding of the code is difficult to occur due to stains or flaws and the redundancy is high, so that the capability of picking up the erroneous decoding is high. Further, the information density is essentially high, so that even in case of a rough pattern such as one directly printed on paper board, a comparatively small-sized coded label can be formed. Therefore, the coded label can be utilized even in case where luggages are much damaged as at the terminal of a material handling system.

Hereunder, the details of the embodiments of this invention will be described with reference to the drawings.

Figure 1:
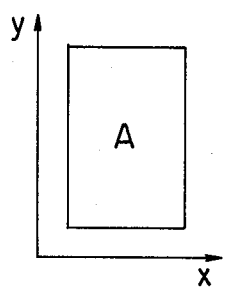
FIGS. 1 to 3 are diagrams showing the configuration and construction of an example of the coded label according to this invention.
Figure 2:
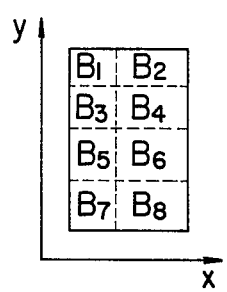
Figure 3:
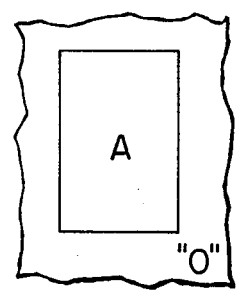

As shown in FIG. 1, one direction of a rectangle A is made x-direction, and the other direction orthogonal thereto is made y-direction. The rectangular pattern A is divided by two in the x-direction and by four in the y-direction, to obtain eight small rectangular segments which are respectively named $B_1$, $B_2$, ... and $B_8$ as indicated in FIG. 2. A code pattern is formed by putting one or more of such rectangular segments into the state "1" and the others into the state "0" and by putting the area surrounding the rectangular pattern A into the state "0" as shown in FIG. 3.

Figure 4:
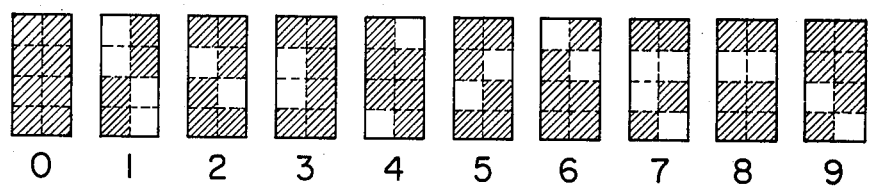
FIG. 4 is a diagram showing various examples of the code pattern according to this invention.
Figure 4:
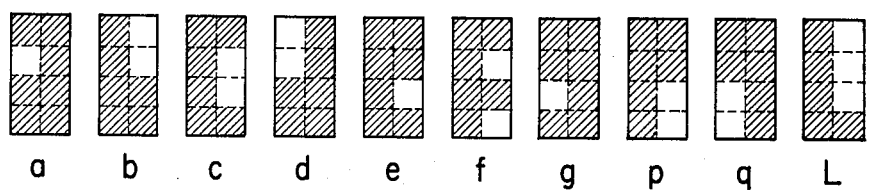
Figure 4:
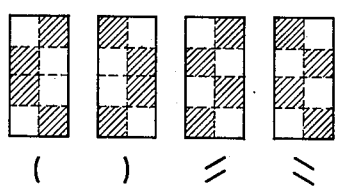

Among various patterns thus constructed, some are caused to correspond to various characters or symbols. FIG. 4 shows such patterns in which, for the sake of simplicity, all the rectangular segments $B_1$, $B_2$, ... and $B_8$ are made congruent squares and in which the state "1" is indicated by hatching and the state "0" by blank. In the figure, the surroundings of the rectangular code pattern are in the state "0" and are naturally represented by blank.

The examples of the code patterns of this invention as constructed on the above conditions are determined to correspond to characters or symbols indicated below the respective patterns. Although such relations of correspondence may be arbitrarily set, the specific characters and symbols similar to the patterns are caused to correspond in the figure. This measure brings forth the merit that what character or symbol the pattern corresponds to can be easily conjectured by glancing at the pattern.

Further, in any of the code patterns in FIG. 4, among the segments arrayed in four rows and two columns, at least one of the segments $B_1$ and $B_2$ in the uppermost row is made the state "1," at least one of the segments $B_7$ and $B_8$ of the lowermost row is made the state "1," at least one of the segments $B_1$, $B_3$, $B_5$ and $B_7$ of the left column is made the state "1," and at least one of the segments $B_2$, $B_4$, $B_6$ and $B_8$ of the right column is made the state "1." All the segments other than those of the state "1" are made the state "0."

When all the code patterns are such, there is the merit that the contours of the code patterns can be easily found. More specifically, when only a pattern in which only one segment in either column, for example, the segment $B_1$ is in the state "1" and all the other segments $B_2$, $B_3$, ... and $B_8$ are in the state "0" is shown, it is difficult to be distinguished from a similar pattern, for example, one in which only the segment $B_4$ is in the state "1" and all the other segments are in the state "0." In contrast, with the code patterns which are formed on the foregoing conditions, an x coordinate at which the presence of the state "1" is detected for the first time by sequentially examining the pattern in the plus sense from the minus side in the x-direction corresponds to the x coordinate of the left contour line of the code pattern A, and hence, in any of the patterns, the contour line of the code pattern A as forms the foundation of the construction of the pattern can be found. It can be known from this information which of the segments $B_1$, $B_2$, ... and $B_8$ are in the state "1" and which are in the state "0." Therefore, the code patterns can be uniquely discriminated.

Among the code patterns in FIG. 4, those other than that corresponding to the symbol L fulfill the foregoing conditions, and further, have at least two of the segments $B_1$, $B_3$, $B_5$ and $B_7$ of the left column made the state "1" and at least two of the segments $B_2$, $B_4$, $B_6$ and $B_8$ of the right column made the state "1." That is, regarding these patterns, the squares of the state "1" occupy at least a half of the number of the segments in any of the uppermost row, the lowermost row, the left column and the right column. This brings forth the merit that the detection of the contour line of the code pattern A as stated above can be stably done.

Among the code patterns in FIG. 4, the others than those corresponding to the symbols L, a, e and g fulfill the foregoing conditions, and further, they are such that among the eight segments in four rows and two columns, the number of the segments of the state "1" is even. Accordingly, even if one of the eight segments is inverted from the state "0" to the state "1" or vice versa for the reason of stains or the like, it turns out that the number of the segments of the state "1" becomes odd. Therefore, the occurrence of the state inversion can be immediately found out by removing the patterns L, a, e and g beforehand. Moreover, with such measure, it is not feared that a certain pattern will become another kind of pattern.

Among the code patterns in FIG. 4, the others than those corresponding to L, a, e, g, 3, b, c, d, f, p and q fulfill the foregoing conditions, and further, they are such that the number of the segments of the state "1" among the segments $B_1$, $B_3$, $B_5$ and $B_7$ of the left column is equal to the number of the segments of the state "1" among the segments $B_2$, $B_4$, $B_6$ and $B_8$ of the right column. This can render stable a processing for evaluating the coordinates of the center of the code pattern A, besides bringing forth the merits mentioned previously. In the processing, a method to be stated now can be employed. The pattern is inspected in the plus sense from the minus side in the x-direction. After detecting the presence of the state "1" for the first time, the inspecting range is further advanced in the plus sense in the x-direction. Thus, an x coordinate at which the area of the state "1" has become a fixed value is obtained. Subsequently, the pattern is inspected in the minus sense from the plus side in the x-direction. Likewise to the above, an x coordinate at which the area of the state "1" has become the fixed value is obtained. The average between both the x coordinates is made the x coordinate of the center of the code pattern A.

According to this method, it is made the condition of judgement that the area of the state "1" becomes the fixed value. Therefore, the merit is brought forth that even when a small stain or flaw of the state "1" exists in the code pattern, the influence can be neglected. Herein, when the processing as described above is performed in case where the left column includes four segments of the state "1" and the right column includes one segment of the state "1" as in the code pattern L in FIG. 4, the central coordinate of the code pattern A is found on the left side of the true center. However, as to the code patterns in which the numbers of the segments of the state "1" are equal between the right and left columns, such problem is not involved, and the processing is effective.

As a method for expressing information with the code patterns as shown in FIG. 4, there is one in which several of the code patterns are employed and the permutations thereof are relied on. The order of the code patterns is established in the downward direction, rightward direction, etc., and in extreme cases, in an oblique direction, at every second patterns, etc. Here will be stated a case where the code unit patterns are arranged rightwards in succession.

Figure 5:
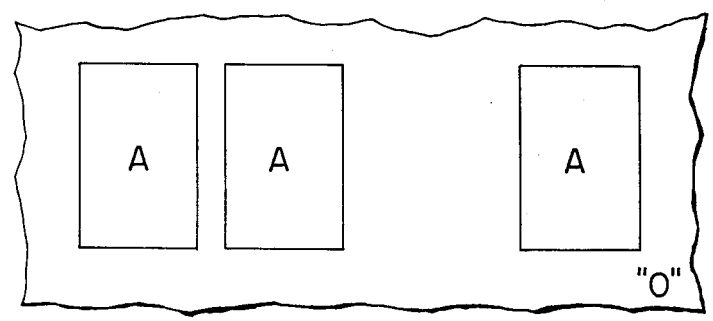

When the code patterns A in FIG. 3 are successively arranged rightwards, the result becomes as shown in FIG. 5. Here, a part of the state "0" is interposed also between the two code patterns A.

FIGS. 6 and 7 show examples in which three of the code patterns shown in FIG. 4 are successively arranged rightwards and in which a numerical information of "256" is expressed by the relations of correspondence to the characters in FIG. 4. In both the figures, the spacing between the adjacent code patterns A is made ½ of the lateral width of the code pattern A. In the example of FIG. 6, the state "1" is illustrated in black (by hatching in the drawing) and the state "0" in white (by blank). In the example of FIG. 7, conversely the state "1" is illustrated in white and the state "0" in black.

Now, an example of a processing in which the coded label of this invention is automatically read by a code reader will be stated, and thus, it will be demonstrated that the coded label of this invention is suitable for the reading by the apparatus.

FIG. 8 shows an example of the fundamental construction of a reader for reading the coded label of this invention. Numeral 11 designates a luggage which is packed in a carton or the like, numeral 12 the coded label of this invention as is directly printed on the luggage in the carton or the like 11, numeral 13 a belt conveyor for transporting the luggage 11, numeral 14 an imaging device, such as TV camera, which has a field of view as indicated by broken lines, and numeral 15 a code reader which controls the operation of the imaging device 14 and which processes a video signal from the imaging signal so as to read a code written on the coded label.

In the construction of the apparatus in FIG. 8, the imaging device 14 and the code reader 15 may be continually and repeatedly operated so as to await for the coded label 12 to enter the field of view of the imaging device 14 owing to the movement of the luggage 11 in the direction of an arrow indicated. Alternatively, the conveyor 13 may be intermittently operated, and the imaging device 14 and the code reader 15 may be operated at the time when the luggage 11 stops temporarily. Further, in case where the conveyor 13 is continuously operated, it may be detected by an optical switch or the like that the luggage 11 has come to a predetermined position, and the imaging device 14 and the code reader 15 may be operated at this time.

When the imaging device 14 operates during the movement of the luggage 11, it is feared that the image of the coded label 12 will be picked up in a vibrating state. In such case, an imaging element having an image storing property, for example, a vidicon tube is employed as the imaging device 14, and using an illuminator of the instantaneous illumination type, for example, a xenon discharge tube, the vicinity of the field of view of the imaging device 14 is illuminated when the arrival of the luggage 11 is detected by the optical switch or the like. Thus, the video signal of the coded label 12 as involves very little image vibration can be obtained.

Description will be made of concrete means for reading the code by the construction of the apparatus as shown in FIG. 8. Supposing that the imaging device 14 is a standard TV camera, brightness signals are obtained in time sequence by the so-called standard television scanning system in which the rightward horizontal scanning is downwardly repeated in the vertical direction. In order to process the signals by a digital circuit, they are chopped (sampled) by, for example, 6 MHz. The imaging device is controlled in such a way that a horizontal synchronizing signal for starting the horizontal scanning is generated at every 382 choppings and that a vertical synchronizing signal for starting the vertical scanning is generated at every 262 horizontal synchronizing signals. Then, an image frame can be divided by 382 in the horizontal direction and by 262 in the vertical direction. Here, the individual elements divided are termed picture elements. Each of the picture elements has a quantity of brightness, which is, in general, quantized by an A-D converter or the like immediately before or after the chopping.

A method for judging the presence of a specific pattern such as code pattern from the picture element information transferred in time sequence as described above will be explained with reference to FIG. 9 and FIGS. 10(a)–10(c).

FIG. 9 is an explanatory view showing the arrayal of picture elements on an image frame in which the numbers of picture elements in the horizontal direction (y-direction) and vertical direction (x-direction) are respectively made eight and six in order to facilitate understanding of the operating principle of an apparatus in FIG. 10(a). In case of FIG. 9, video signals are transferred in the order of the picture elements 0, 1, 2, 3, 4, 5, 6, 7, 8, 9, A, B, C, D, E, F, G, H, I, J, K, M, N, P, R, S, T, U, V, W, . . . , X, Y and Z, and the transfer is repeated.

Figure 10B:
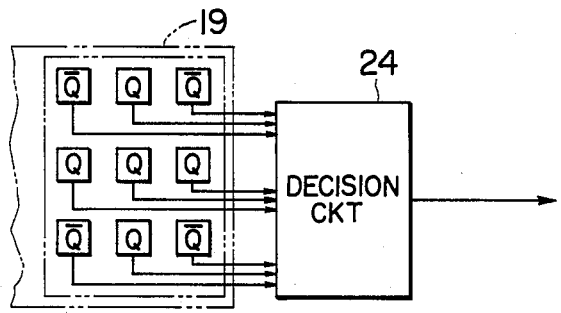
Figure 10C:
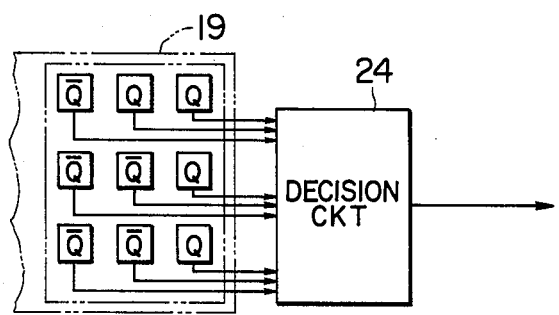
Figure 12:
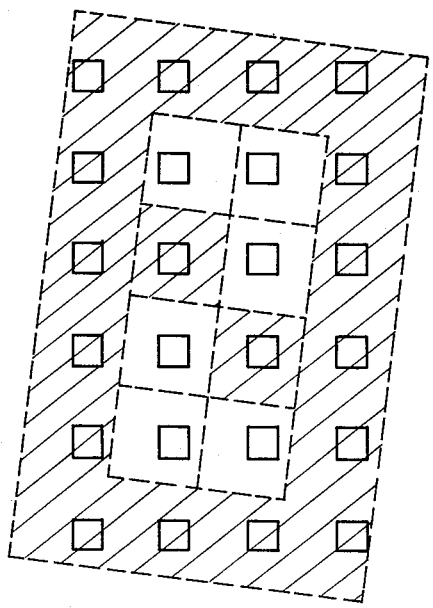
Figure 13:
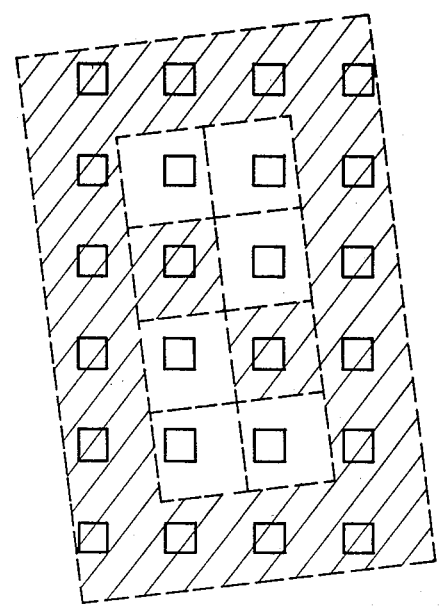

FIGS. 10(a) to 10(c) show concrete circuit arrangements of a code reader as create such video signals and judge the presence of a specific pattern therefrom. In the figures, 14' designates a vidicon camera which is an example of the imaging device 14 in FIG. 8. Video signals outputted from the vidicon camera 14' are converted by a bi-valuing circuit 16 into binary information, for example, "1" for a bright image and "0" for a dark image. The bi-valuing circuit is also called a threshold processing circuit, and is well known.

The binary signals outputted from the bi-valuing circuit 16 are chopped by a sampling circuit 17. A pulse for bestowing the period of the chopping is impressed from a pulse generating circuit 18. Both the chopping circuit and the pulse generating circuit for the sampling are well known, and a detailed explanation is omitted.

Picture element information outputted from the sampling circuit 17 are bestowed on a shift register 19. The shift register 19 consists of nineteen 1-bit registers, and conducts a shift operation at every timing pulse impressed from the pulse generating circuit 18. Here, the nine registers depicted by thick lines and enclosed with one-dot chain lines have read-out lines led therefrom as shown in FIGS. 10(b) and 10(c). They output states Q and $\overline{Q}$, with which a pattern is judged by a decision circuit 24 as stated below. The output state Q is the same state as the internal state of the register, while the output state $\overline{Q}$ is the state opposite to the internal state.

The purposes of operation of the shift register 19 are to temporarily store the picture element information transferred in time sequence, to read out information in predetermined several places in the storage, and to simultaneously read out information of picture elements being two-dimensionally close among the picture information. Therewith, when the scanning position advances by one element on the image frame, the read-out region of the shift register is also moved. As the result, when the whole image frame has been scanned, the read-out regions have covered all the positions on the image frame.

When the scanning point lies at the position of, for example, the picture element V in FIG. 9, the contents of the nine readable registers 19a depicted by the thick lines in FIG. 10(a) correspond to the nine picture elements enclosed with thick lines in FIG. 9, and the contents of the ten registers 19b depicted by fine lines and enclosed with two-dot chain lines in FIG. 10(a) correspond to the ten picture elements enclosed with broken lines in FIG. 9. When the scanning position shifts from the picture element V to the picture element W, the contents of the picture elements B, C, D, J, K, M, U, V and W are stored in the readable registers depicted by the thick lines in FIG. 10(a), and the region surrounded by the thick lines in FIG. 9 moves rightwards by one column.

Thus, as the scanning position of the imaging device moves, the contents of the shift register 19 move, too. The group of picture elements stored by the readable registers 19a in the shift register move while conserving the two-dimensional arrayal, too.

Here will be explained means for controlling the scanning of the vidicon camera 14′. Numerals 20 and 22 denote counters, and numerals 21 and 23 digital comparators. The counter 20 receives the timing pulses from the pulse generating circuit 18, and counts them. When the content of the counter 20 has coincided with the number of picture elements in the horizontal direction, the comparator 21 provides an output to reset the content of the counter 20 to zero and to transmit a horizontal synchronizing signal to the vidicon camera 14′. The output is also transmitted to the counter 22 and is counted by it.

When the content of the counter 22 has coincided with the number of picture elements in the vertical direction, the comparator 23 provides an output to reset the content of the counter 22 to zero and to transmit a vertical synchronizing signal to the vidicon camera 14′. Further, the numbers of picture elements in the horizontal and vertical directions are eight and six in the example of FIG. 9, respectively. In case of conforming with the standard television scanning system, it is appropriate to make the respective numbers 382 and 262 and to make the timing pulse frequency 6 MHz.

Referring now to FIG. 10(b), the decision circuit 24 is a circuit which judges or decides if the contents applied through the read-out lines from the readable registers 19a in the shift register 19 form a specific pattern. By way of example, the readable registers 19a are determined as shown, i.e.:

$\overline{Q}, Q, \overline{Q},$ $Q, Q, Q,$ $\overline{Q}, Q, \overline{Q}$

Then, when their contents become:

"0," "1," "0,"

"1," "1," "1,"

"0," "1," "0"

all the outputs of the registers 19a become "1."

Accordingly, the decision circuit 24 can be realized by an AND gate circuit if "1" is outputted in case where an input pattern is quite identical to the above pattern and "0" is outputted in any other case. If "1" is outputted even in case where the input pattern differs from the above pattern in the states of one to several picture elements, the decision circuit 24 may be constructed by the use of a threshold processing circuit in which a current i is caused to flow when the output of the readable register 19a is "1" and no current is caused to flow when it is "0", in which such currents are joined, and which provides an output "1" when the resultant joined current exceeds a fixed value and provides an output "0" otherwise.

With the example of the logical construction in FIG. 10(c), when the contents of the readable registers become:

"0," "1," "1,"

"0," "0," "1,"

"0," "0," "0"

all the outputs become "1."

Using the circuits of the arrangements as shown in FIGS. 10(a)-10(c), it is possible to inspect if the specific pattern exists in the video signals picked up by the vidicon camera 14′. Although there are only two specific patterns in the examples of FIGS. 10(a)-10(c), it is of course possible and can be easily conjectured from the above explanation to further increase the specific patterns. Although the foregoing specific patterns are exemplified as consisting of the nine picture elements of three rows and three columns, it is needless to say that the scale or size can be altered according to the complicacy of a specific pattern.

Figure 11:
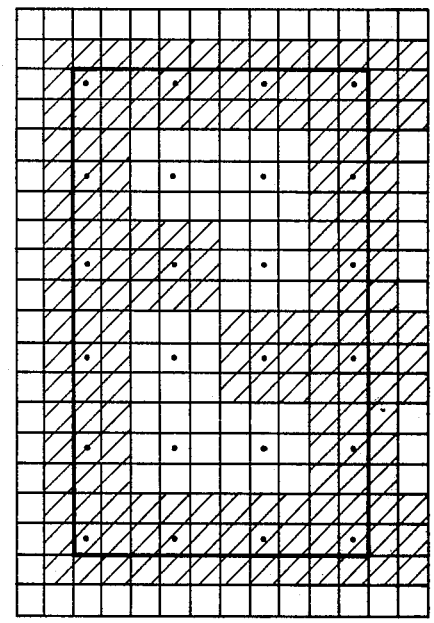
FIG. 11 is a pattern diagram for explaining a deciding operation in FIGS. 10(a) to 10(c), FIGS. 12 to 15 are diagrams showing the states in which a code pattern is deformed.

FIG. 11 shows an example of an image obtained in such a way that the pattern indicative of numeral 2 among the code patterns illustrated in FIG. 7 was picked up by the vidicon camera 14′ in FIG. 10(a). In FIG. 11, fine lines in both the horizontal and vertical directions indicate the boundaries of picture elements. In order to discriminate the code pattern which becomes such video signals, the following measure may be taken by way of example. 160 picture information in 16 rows and 10 columns within an area surrounded by thick lines in the figure are temporarily stored in the readable shift registers 19a stated with reference to FIGS. 10(a)-10(c). The outputs Q are derived from the registers corresponding to the hatched picture elements in FIG. 11, and the outputs $\overline{Q}$ are derived from the other registers. They are respectively inputted to the decision circuit.

More simply, however, outputs may be derived from the registers corresponding to the 24 picture elements indicated by dots and may be inputted to the decision circuit. Also in this case, the outputs Q are derived from the registers corresponding to the hatched picture elements, and the outputs $\overline{Q}$ from the other registers. Thus, in case of the code pattern as in FIG. 7, among the register outputs in six rows and four columns to become the object of decision, the uppermost row, lowermost row, leftmost column and rightmost column transmit the outputs Q without fail, and the remaining eight register outputs correspond to the code pattern of this invention as consists of the rectangles in four rows and two columns. Therefore, Q or $\overline{Q}$ may be transmitted according to the conditions described with reference to FIG. 4.

FIGS. 12 to 15 are views for explaining the extent to which a code pattern in the case of making the picture elements of six rows and four columns the object as stated above can endure a deformation. In case of reading a code with the apparatus construction as in FIG. 8, there is the possibility that the code pattern to be picked up will incline or become smaller or larger in dependence on the posture or position of the luggage. Even in such case, the code reading must be possible to some extent.

The code of this invention has a property very suitable for such case. Even when the code pattern inclines rightwards as in FIG. 12 or leftwards as in FIG. 13, or it becomes smaller as in FIG. 14 or larger as in FIG. 15, states in 24 squares in each figure as correspond to the picture elements indicated by the dots in FIG. 11 do not change at all. In consequence, a circuit for making decision with the states can always output a correct result of decision. That is, the coded label of this invention has the feature that it can be easily read even when it inclines or becomes farther or nearer, though of course the method of constructing the code reader is greatly concerned. Although only the code pattern of numeral 2 illustrated in FIG. 7 has been explained here, quite the same applies to any other code pattern according to this invention. The pattern, as illustrated in FIG. 6, in which white and black are inverted can be similarly handled merely by, for example, inverting the threshold processing conditions of the bi-valuing circuit.

Furthermore, when only the picture elements indicated by the dots in FIG. 11 are made the object of decision, the various patterns shown in FIG. 4 can be modified as in FIG. 16 because the four corners of each of the rectangles or squares $B_1, B_2, B_3, \ldots$ and $B_8$ forming the foundations of the code pattern are scarcely related to the decision. In this way, the patterns can be made easier to read by the visual inspection.

As set forth above, the coded label according to this invention is easily read by a person, and is easily subjected to automatic reading by an apparatus. Besides, it is high in redundancy. It is very highly valuable in the aspect of industrial applications.

We claim:

1. A coded label comprising at least one code pattern to be read by a code reader in which segments having a specific shape and assuming either of first and second physical characteristics different from each other are arranged in a plurality of rows and a plurality of columns, and an area of the coded label surrounding said code pattern having said second physical characteristic, at least one segment of said first physical characteristic being arranged in each of both end rows of said code pattern.

2. The coded label according to claim 1, wherein at least one segment of said first state is arranged in each of both end columns of said code pattern.

3. The coded label according to claim 1, wherein the number of said segments of said first state arranged in either of each column and each row of said code pattern is equal to or larger than the number of said segments of said second state similarly arranged.

4. The coded label according to claim 1, wherein the number of said segments of said first state in said code pattern is either of even and odd numbers.

5. The coded label according to claim 1, wherein the number of said segments of said first state arranged in either of each column and each row of said code pattern is equal.

6. The coded label according to claim 1, wherein the shape of said each segment is a rectangle.

7. The coded label according to claim 1, wherein in constructing the code pattern by arraying said segments in m rows and n columns, the value m is at least four, and the value n is at least two.

8. The coded label according to claim 7, wherein said segments constituting said code pattern and assuming either of said first and second states are arrayed so as to represent a specific symbol.

9. The coded label according to claim 7, wherein the number of said segments of said first state arranged in either of each column and each row of said code pattern is equal to or larger than the number of said segments of said second state similarly arranged.

10. The coded label according to claim 1, wherein the numbers of said segments of said first state arranged in respective columns are equal to each other.

11. The coded label according to claim 1, wherein the coded label consists of said at least one code pattern and said area surrounding said code pattern.

12. The coded label according to claim 11, wherein the numbers of said segments of said first state arranged in respective columns are equal to each other.

13. A reader comprising image pickup means for picking up an image pattern including a coded label comprising at least one code pattern in which segments having a specific shape and assuming either of first and second states different from each other are arranged in a plurality of rows and a plurality of columns, and an area of the coded label surrounding said code pattern assuming said second state, at least one segment of said first state being arranged in each of both end rows of said code pattern, and decision means for deciding a content of said code pattern from said image pattern picked up by said image pickup means.

14. The reader according to claim 13, wherein said decision means includes extraction means for extracting a part of said image pattern from said image pickup means, and judgement means for judging if the partial pattern extracted by said extraction means coincides with the specific pattern.

15. The reader according to claim 14, wherein said extraction means includes bi-valuing means for binary-coding said image pattern from the image means, sampling means for sampling at a predetermined period the pattern binary-coded by said bi-valuing means, and shift register means for storing outputs of said sampling means in succession.

16. A machine readable coded label comprising a label member having at least a first surface area and at least one code pattern disposed on said first surface area of said label member to be read by a reading machine, said code pattern including a plurality of segments of a predetermined shape, said plurality of segments being arranged in a plurality of rows and a plurality of columns on said first surface area of said label member, each of said segments having either first or second physical characteristics, and a region of said first surface area of said label member surrounding said code pattern having said second physical characteristic, at least one segment of said code pattern arranged in each of both end rows of said code pattern disposed on said first surface area of said label member having said first physical characteristic, said code pattern disposed on said first surface area of said label member enabling easy discrimination of the contours thereof and correct decoding by the reading machine.

17. The coded label according to claim 16, wherein said first physical characteristic is provided by predetermined ones of said plurality of segments having a first light property and said second physical characteristic is provided by other predetermined ones of said plurality of segments and said region of said first surface area of said label member surrounding said code pattern having a second light property.

18. The coded label according to claim 16, wherein at least one segment having said first physical characteristic is arranged in each of both end columns of said code pattern.

19. The coded label according to claim 16, wherein the number of said segments having said first physical characteristic arranged in either of each column and each row of said code pattern is at least equal to the number of said segments having said second physical characteristic similarly arranged.

20. The coded label according to claim 16, wherein the number of said segments having said first physical characteristic arranged in at least one of each column and each row of said code pattern is equal.

21. The coded label according to claim 16, wherein said code pattern comprises said plurality of segments arranged in at least four rows and at least two columns.

22. The coded label according to claim 16, wherein said segments arranged in said rows and columns are adjoining segments.

23. The coded label according to claim 22, wherein said segments are congruent rectangles.

24. The coded label according to claim 23, wherein said segments are congruent squares.

25. The coded label according to claim 16, wherein a plurality of said code patterns is disposed on said first surface area of said label member, each of said code patterns being representative of one of a same or different character.

26. The code label according to claim 25, wherein each of said code patterns further includes at least one segment having said first physical characteristic arranged in each of both end columns.

27. The coded label according to claim 26, wherein each code pattern is provided with two columns and four rows.

28. The coded label according to claim 16, wherein said code pattern is arranged in two columns and four rows.

29. The coded label according to claim 28, wherein said code pattern further includes at least one segment having said first physical characteristic arranged in each of said two columns thereof.

30. A reading machine comprising image pickup means for picking up an image pattern including a coded label having at least one code pattern disposed on a first surface area of said label, said code pattern having a plurality of segments of a predetermined shape with said plurality of segments being arranged in a plurality of rows and a plurality of columns on said first surface area of said label, each of said segments having either first or second physical characteristics and a region of said first surface area of said label surrounding said code pattern having said second physical characteristic, at least one segment arranged in each of both end rows of said code pattern disposed on said first surface area of said label having said first physical characteristic, decision means for determining a content of said code pattern from said image pattern picked up by said image pickup means, and means for providing an output signal in response to said decision means.

31. A reading machine according to claim 30, wherein said decision means includes extraction means for extracting a part of said image pattern from said image pickup means, and determining means for determining if the partial pattern extracted by said extraction means coincides with a predetermined pattern.

32. A reading machine according to claim 31, wherein said extraction means includes by-valuing means for binary-coding said image pattern from said image pickup means, sampling means for sampling at a predetermined period the pattern binary-coded by said by-valuing means, and shift register means for storing outputs of said sampling means in succession.

* * * * *